United States Patent
Nagura

(10) Patent No.: US 7,561,500 B2
(45) Date of Patent: Jul. 14, 2009

(54) APPARATUS USING LIGHT-ATTENUATING ELEMENT FOR OPTICALLY REPRODUCING AND RECORDING INFORMATION

(75) Inventor: Chihiro Nagura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 555 days.

(21) Appl. No.: 11/434,103

(22) Filed: May 16, 2006

(65) Prior Publication Data

US 2006/0280097 A1 Dec. 14, 2006

(30) Foreign Application Priority Data

May 30, 2005 (JP) .............................. 2005-157455

(51) Int. Cl.
*G11B 7/00* (2006.01)
(52) U.S. Cl. .................................................. 369/44.23
(58) Field of Classification Search ....................... None
See application file for complete search history.

(56) References Cited

U.S. PATENT DOCUMENTS

| | | | |
|---|---|---|---|
| 5,137,358 A | | 8/1992 | Perkins |
| 5,859,730 A | * | 1/1999 | Ikeya ........................... 359/796 |
| 6,088,170 A | * | 7/2000 | Lee et al. ..................... 359/710 |
| 7,180,844 B2 | * | 2/2007 | Chuang ....................... 369/103 |
| 7,298,686 B2 | * | 11/2007 | Miyake .................. 369/112.02 |
| 2003/0095492 A1 | * | 5/2003 | Nishino et al. ......... 369/112.08 |
| 2005/0094509 A1 | | 5/2005 | Nagura |
| 2007/0104045 A1 | | 5/2007 | Nagura |

FOREIGN PATENT DOCUMENTS

| | | | |
|---|---|---|---|
| JP | 02267744 A | * | 11/1990 |
| JP | 05062238 A | * | 3/1993 |
| JP | 6-13683 | | 1/1994 |
| JP | 2002-150601 | | 5/2002 |

* cited by examiner

*Primary Examiner*—Peter Vincent Agustin
(74) *Attorney, Agent, or Firm*—Fitzpatrick, Cella, Harper & Scinto

(57) ABSTRACT

An apparatus for optically recording information in a recording medium and for optically reproducing the recorded information includes a semiconductor laser, an objective lens that focuses light beams from the laser on the recording medium, and a light-attenuating element for attenuating an amount of light of the light beams. The light-attenuating element has a transmittance distribution for shaping the section of the light beams into an approximate circle.

26 Claims, 11 Drawing Sheets

APPARATUS USING LIGHT-ATTENUATING ELEMENT FOR OPTICALLY REPRODUCING AND RECORDING INFORMATION

BACKGROUND OF THE INVENTION

1. Field of the Invention

The present invention relates to apparatuses for optically reproducing information from and recording information onto recording media.

2. Description of the Related Art

To date, optical pickups having semiconductor lasers as light sources have been used in apparatuses for optically reproducing and recording information from and onto recording media.

Recently, wavelengths of the lasers have been decreasing as recording of information has been becoming more highly densified, and systems using blue-violet semiconductor lasers having a wavelength of 400 nm have been put to practical use.

Blue lasers are noisy at low powers of 3 mW or lower, and sufficient signal-to-noise (S/N) ratios of regenerative signals are difficult to achieve.

To solve this problem, methods for reducing laser noise by disposing neutral-density (ND) filters on optical paths during reproducing are proposed in Japanese Patent Laid-Open Nos. 6-13683 and 2002-150601, for example.

The noise of the semiconductor lasers is reduced as the output of the lasers is increased. Accordingly, the laser noise can be reduced by reducing optical efficiency during reproducing of the signals and by setting the output of the lasers to a high value.

In general, the shape of light beams emitted from the semiconductor lasers is elliptical.

When lasers having a large aspect ratio of the major axis of the ellipse to the minor axis are used, required resolution cannot be achieved either in a direction parallel to tracks or in a direction perpendicular to the tracks, resulting in unstable reproducing and recording.

Therefore, the sections of the light beams are approximated to isotropic circles with anamorphic prisms (so-called beam shaping).

FIG. 17 illustrates a known apparatus for optically reproducing and recording information.

Divergent elliptical light beams emitted from a semiconductor laser 101 are collimated by collimating lenses 102, and enter anamorphic prisms 104.

The light beams shaped into an approximate circle by the anamorphic prisms 104 pass through a polarized-beam splitter 105 disposed downstream of the anamorphic prisms 104.

Part of the incident beams is reflected, and is converged on a front-monitoring photodiode 107 by a monitoring lens 106.

The output of the semiconductor laser 101 is controlled on the basis of the output of this front-monitoring photodiode 107.

On the other hand, the light beams passing through the polarized-beam splitter 105 are converted into circularly polarized light beams by a quarter-wave plate 108, and the resultant beams enter a beam expander 109.

The beam expander 109 includes a combination of a concave lens and a convex lens. The concave lens is movable in the optical-axis direction so as to correct spherical aberration generated by an error in thickness of a protective layer on the recording medium.

The light beams passing through the beam expander 109 are converged on a recording medium 111 by an objective lens 110 having a numerical aperture (NA) of 0.85.

The light beams reflected from the recording medium 111 pass through the objective lens 110, the beam expander 109, and the quarter-wave plate 108, and are reflected by the polarized-beam splitter 105 so as to be guided to a photodetector 114 by a converging lens 112 and a sensor lens 113.

During reproducing of signals, an ND filter 103 is inserted into the optical path such that the output of the semiconductor laser 101 is set to high for noise reduction.

During recording of signals, the ND filter 103 is removed from the optical path.

In this manner, an optical pickup having high optical resolution and which is not easily influenced by laser noise can be achieved with the beam-shaping element and the light-attenuating element.

However, an apparatus including both the light-attenuating element and the beam-shaping element becomes large and results in an increase in cost.

SUMMARY OF THE INVENTION

The present invention can provide an apparatus for optically reproducing and recording information having a simplified structure and realizing stable reading-writing operations.

An apparatus for optically reproducing and recording information according to one aspect of the present invention can include a semiconductor laser, an objective lens that focuses light beams from the laser on a recording medium, and a light-attenuating element for attenuating an amount of light of the light beams. The light-attenuating element has a transmittance distribution for shaping the section of the light beams.

In another aspect of the present invention, an apparatus for optically reproducing and recording information can include means for producing laser light beams, means for focusing the light beams from the producing means on a recording medium, and light-attenuating means for attenuating an amount of light of the light beams. The light-attenuating means has a transmittance distribution for shaping the section of the light beams.

With this structure, a small apparatus can be produced at lower costs.

Further features of the present invention will become apparent from the following description of exemplary embodiments with reference to the attached drawings.

DESCRIPTION OF THE EMBODIMENTS

Embodiments of the present invention will now be described with reference to the drawings.

First Embodiment

Figure 1:
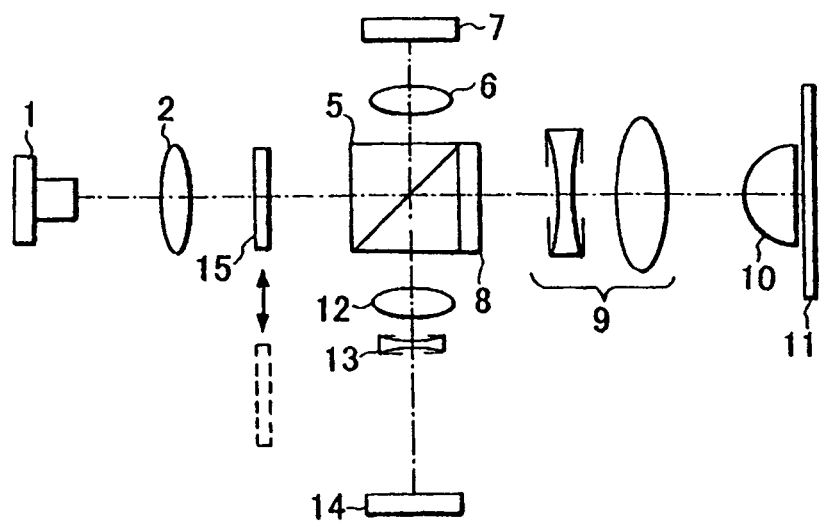
FIG. 1 illustrates an overview of an apparatus for optically reproducing and recording information according to a first embodiment of the present invention.

FIG. 1 illustrates an overview of an apparatus for optically reproducing and recording information according to a first embodiment of the present invention.

Divergent elliptical light beams emitted from a semiconductor laser 1 are collimated by a collimating lens 2, and enter a polarized-beam splitter 5.

Part of the incident beams is reflected, and is converged on a front-monitoring photodiode 7 by a monitoring lens 6.

The output of the semiconductor laser 1 is controlled on the basis of the output of this front-monitoring photodiode 7.

On the other hand, the light beams passing through the polarized-beam splitter 5 are converted into circularly polarized light beams by a quarter-wave plate 8, and the resultant beams enter a beam expander 9.

The beam expander 9 includes a combination of a concave lens and a convex lens. The concave lens is movable in the optical-axis direction so as to correct spherical aberration generated by an error in thickness of a protective layer on the recording medium.

The light beams passing through the beam expander 9 are converged on a recording medium 11 by an objective lens 10.

The light beams reflected from the recording medium 11 pass through the objective lens 10, the beam expander 9, and the quarter-wave plate 8, and are reflected by the polarized-beam splitter 5 so as to be guided to a photodetector 14 by a converging lens 12 and a sensor lens 13.

A light-attenuating element 15 is inserted into the optical path during reproducing of signals, and is removed from the optical path during recording of signals.

The semiconductor laser 1 has a divergent angle θ of 12° in the horizontal direction and a divergent angle θ of 24° in the vertical direction, and thus, has an aspect ratio of two. That is to say, the ratio of the major axis to the minor axis is two. The objective lens 10 is of NA 0.85, and has an effective diameter of 2 mm.

The collimating lens 2 is of NA 0.1, and has a focal length of 13 mm.

When the light-attenuating element 15 is not inserted into the optical path, efficiency of the output from the semiconductor laser 1 to the objective lens 10 is 15%.

The light-attenuating element 15 has a transmittance distribution that is uniform in a direction perpendicular to tracks and that continuously changes in a direction parallel to the tracks. The light-attenuating element 15 is formed of a glass plate and a metallic film deposited on a surface of the glass plate. The transmittance can be adjusted by adjusting the thickness of the metallic film. Moreover, the transmittance distribution is formed on the basis of the thickness distribution of the metallic film deposited on the surface of the glass plate. Such a film-thickness distribution can be realized by depositing the metallic film on sectioned areas with masks.

Figure 2:
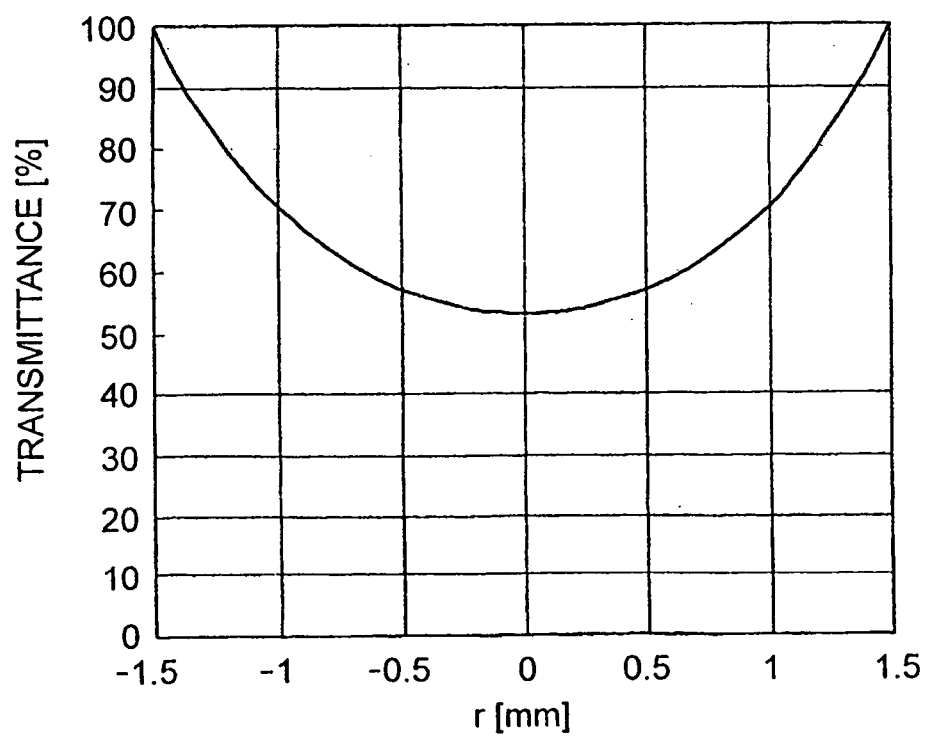
FIG. 2 is a graph illustrating a transmittance distribution of a light-attenuating element 15 in a direction parallel to tracks in the first embodiment.

FIG. 2 is a graph illustrating the transmittance distribution of the light-attenuating element 15 in the direction parallel to the tracks. On the horizontal axis, r indicates distance from the optical axis.

Figure 3:
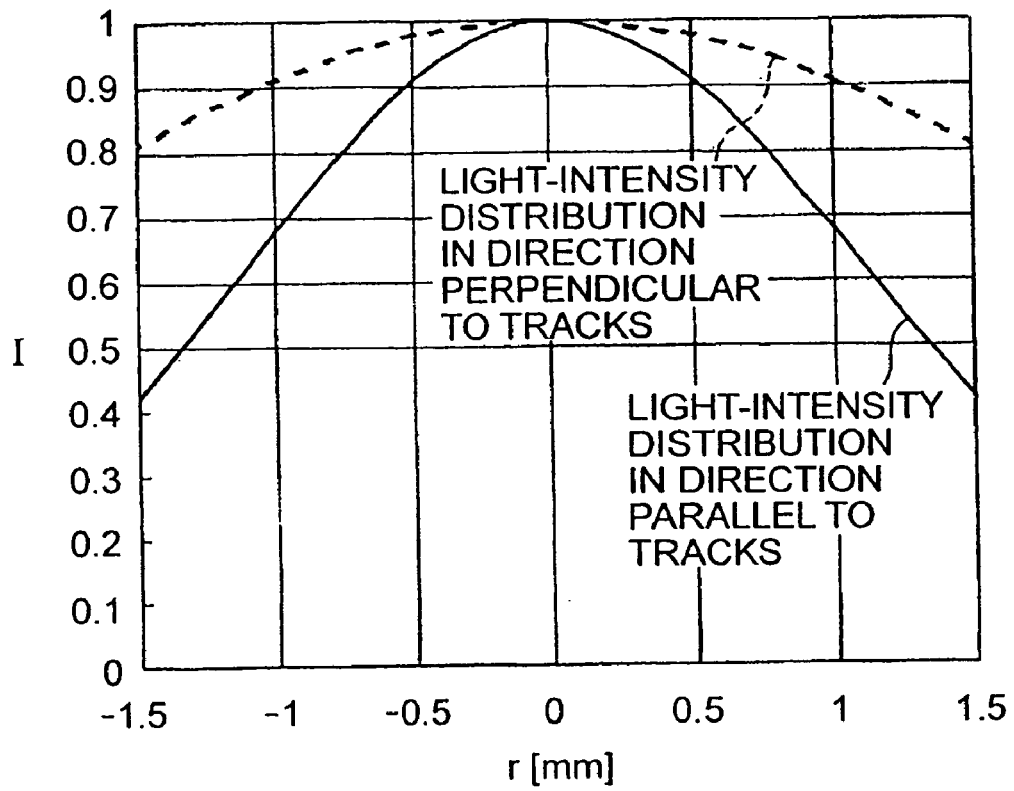
FIG. 3 is a graph illustrating a light-intensity distribution of parallel light beams when the light-attenuating element 15 is not inserted into an optical path in the first embodiment.

FIG. 3 is a graph illustrating a light-intensity distribution of the parallel light beams when the light-attenuating element 15 is not inserted into the optical path. I indicates light intensity when the peak intensity is defined as one.

The light beams are elliptical, having the major axis in the direction perpendicular to the tracks.

At this time, the rim intensity on the objective lens in the direction perpendicular to the tracks is 0.91, and that in the direction parallel to the tracks is 0.68.

Figure 4:
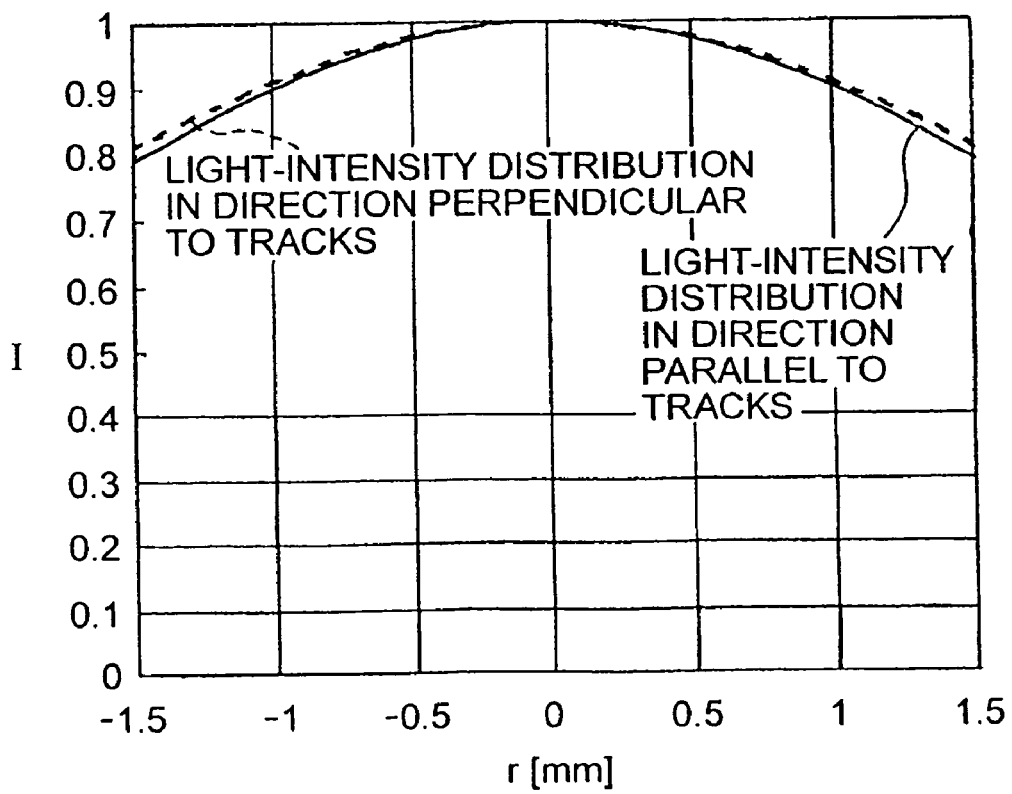
FIG. 4 is a graph illustrating an intensity distribution when the light-attenuating element 15 is inserted into the optical path in the first embodiment.

FIG. 4 is a graph illustrating an intensity distribution when the light-attenuating element 15 is inserted into the optical path.

As is clear from the drawing, the intensity distribution in the direction parallel to the tracks and that in the direction perpendicular to the tracks are substantially identical.

At this time, the rim intensity on the objective lens in the direction perpendicular to the tracks is 0.91, and that in the direction parallel to the tracks is 0.9.

Moreover, an attenuation rate in an effective diameter of the objective lens is approximately 56%, making it possible to perform reading in a sufficiently high-power range of the laser.

For example, when the amount of light emitted from the objective lens 10 during reproducing is 0.3 mW, the output of the semiconductor laser 1 is 4.5 mW. Thus, the influence of the laser noise becomes sufficiently small.

In this manner, required resolution both in the direction parallel to the tracks and in the direction perpendicular to the tracks can be achieved and laser noise can be reduced without requiring separate beam-shaping and light-attenuating elements.

According to the apparatus for optically reproducing and recording the information described above, the light-attenuating element having a beam-shaping function can realize a simplified optical structure and stable and high-precision reading-writing operations of information.

In this embodiment, the beam-shaping is performed only during reproducing, but the light-attenuating element may also be inserted during recording.

Moreover, in this embodiment, the transmittance distribution is utilized for the beam-shaping, but a reflectance distribution, a polarization distribution, or the like, may be utilized.

Second Embodiment

Figure 5:
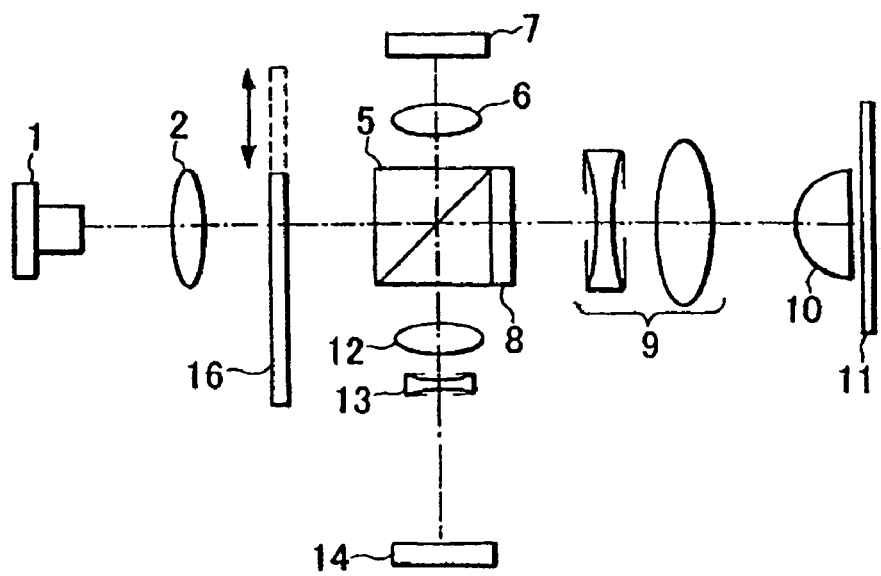
FIG. 5 illustrates an overview of an apparatus for optically reproducing and recording information according to a second embodiment of the present invention.

FIG. 5 illustrates an overview of an apparatus for optically reproducing and recording information according to a second embodiment of the present invention. Like reference numerals will be used to indicate elements similar to those in the first embodiment.

Divergent elliptical light beams emitted from a semiconductor laser 1 are collimated by a collimating lens 2, and enter a polarized-beam splitter 5.

Part of the incident beams is reflected, and is converged on a front-monitoring photodiode 7 by a monitoring lens 6.

The output of the semiconductor laser 1 is controlled on the basis of the output of this front-monitoring photodiode 7.

On the other hand, the light beams passing through the polarized-beam splitter 5 are converted into circularly polarized light beams by a quarter-wave plate 8, and the resultant beams enter a beam expander 9.

The beam expander 9 includes a combination of a concave lens and a convex lens. The concave lens is movable in the optical-axis direction so as to correct spherical aberration generated by an error in thickness of a protective layer on the recording medium.

The light beams passing through the beam expander 9 are converged on a recording medium 11 by an objective lens 10.

The light beams reflected from the recording medium 11 pass through the objective lens 10, the beam expander 9, and the quarter-wave plate 8, and are reflected by the polarized-beam splitter 5 so as to be guided to a photodetector 14 by a converging lens 12 and a sensor lens 13.

A light-attenuating element 16 switches filters on the optical path between a first filter used during reproducing of signals and a second filter used during recording.

The semiconductor laser 1 has a divergent angle θ of 12° in the horizontal direction and a divergent angle θ of 24° in the vertical direction, and thus, has an aspect ratio of two. The objective lens 10 is of NA 0.85, and has an effective diameter of 2 mm.

The collimating lens 2 is of NA 0.13, and has a focal length of 10 mm.

If the light-attenuating element 16 were not inserted into the optical path, efficiency of the output from the semiconductor laser 1 to the objective lens 10 is 20%.

The light-attenuating element 16 has transmittance distributions that are uniform in the direction perpendicular to the tracks and that continuously change in the direction parallel to the tracks.

Figure 6:
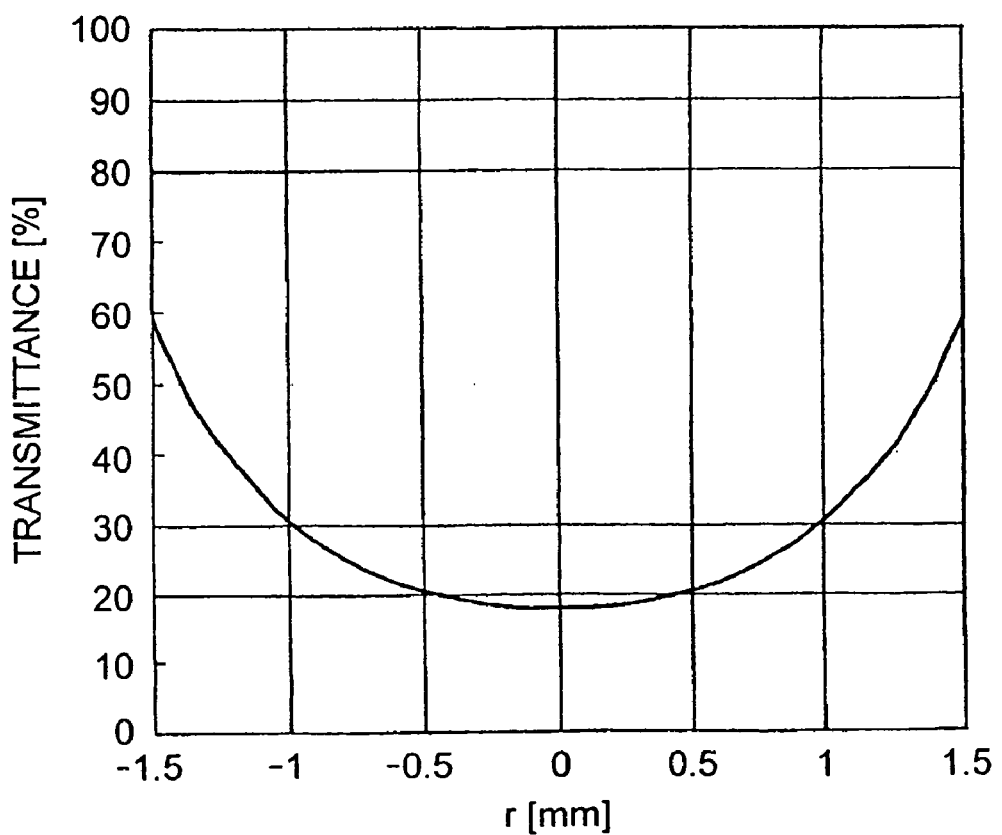
FIG. 6 is a graph illustrating a transmittance distribution of a light-attenuating element 16 in the direction parallel to the tracks during reproducing in the second embodiment.
Figure 7:
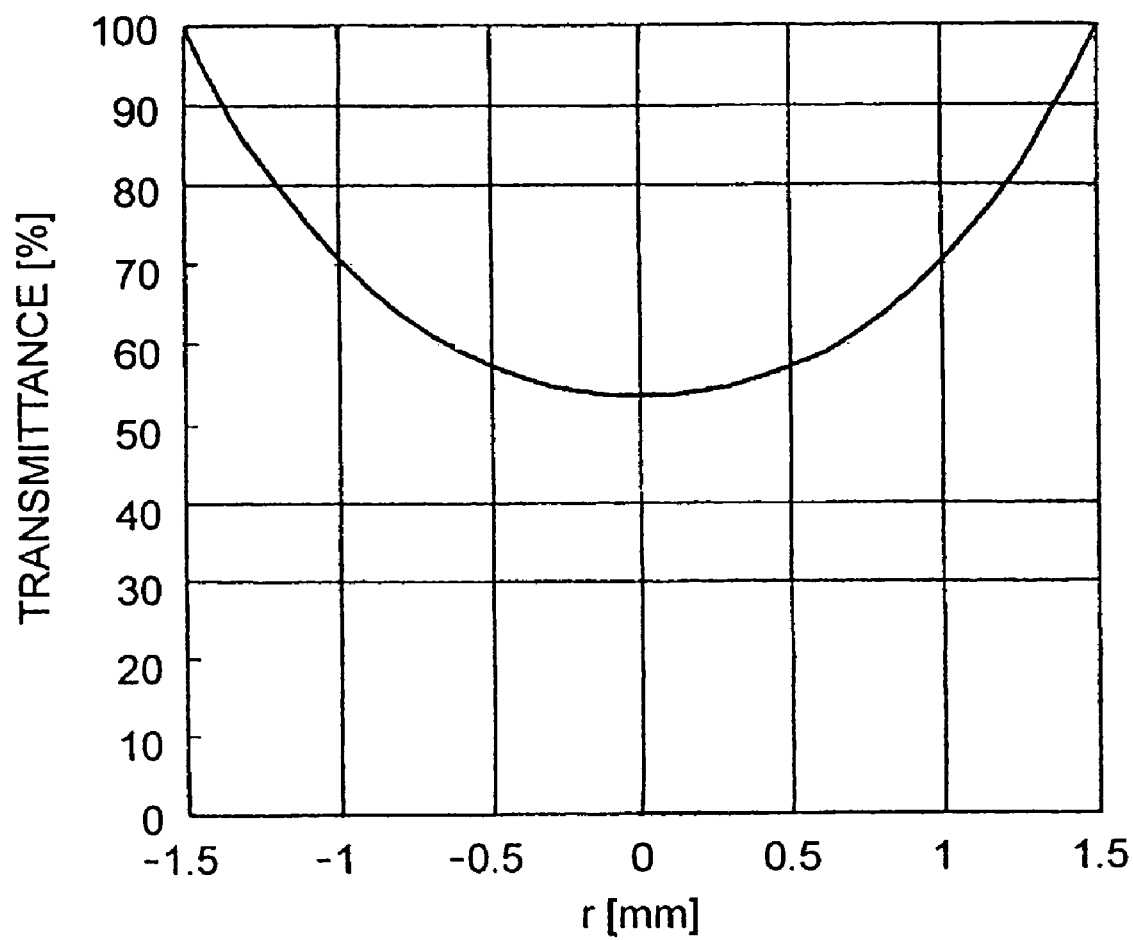
FIG. 7 is a graph illustrating a transmittance distribution of the light-attenuating element 16 in the direction parallel to the tracks during recording in the second embodiment.

FIG. 6 is a graph illustrating a transmittance distribution of the light-attenuating element 16 in the direction parallel to the tracks during reproducing, and FIG. 7 is a graph illustrating a transmittance distribution of the light-attenuating element 16 in the direction parallel to the tracks during recording.

Figure 8:
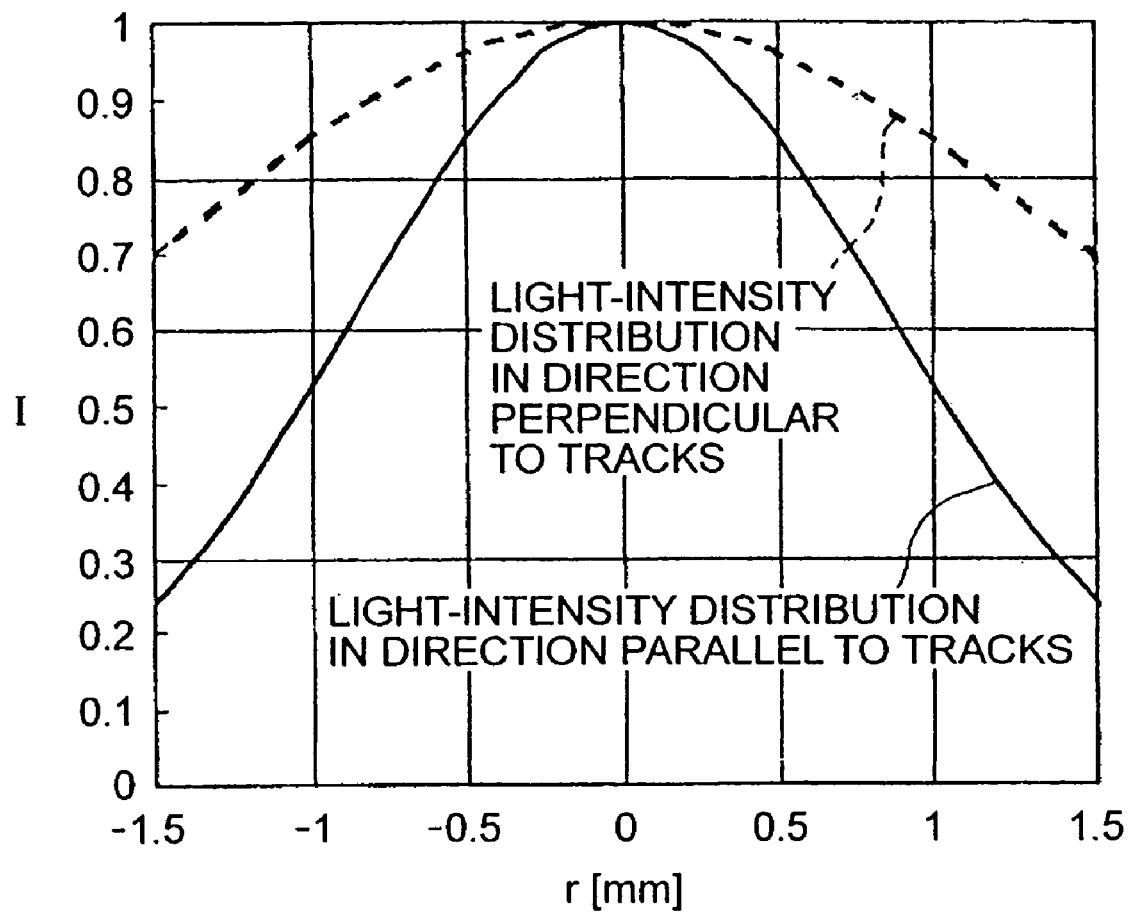
FIG. 8 is a graph illustrating a light-intensity distribution of the parallel light beams if the light-attenuating element 16 were not inserted into the optical path in the second embodiment.

FIG. 8 is a graph illustrating a light-intensity distribution of the parallel light beams if the light-attenuating element 16 were not inserted into the optical path.

The light beams are elliptical, having the major axis in the direction perpendicular to the tracks.

At this time, the rim intensity on the objective lens in the direction perpendicular to the tracks is 0.85, and that in the direction parallel to the tracks is 0.53.

Figure 9:
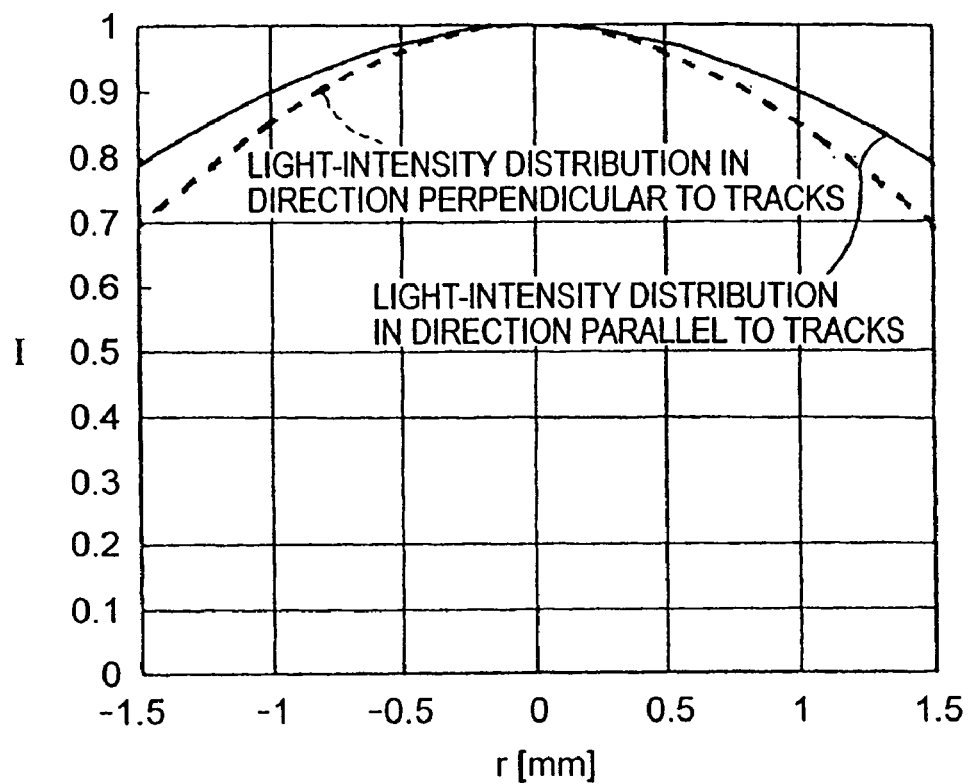
FIG. 9 is a graph illustrating an intensity distribution when the light-attenuating element 16 is switched to a reproducing mode in the second embodiment.

FIG. 9 is a graph illustrating an intensity distribution when the light-attenuating element 16 is switched to a reproducing mode and the first filter is used.

As is clear from the drawing, the intensity distribution in the direction parallel to the tracks and that in the direction perpendicular to the tracks are substantially identical.

At this time, the rim intensity on the objective lens in the direction perpendicular to the tracks is 0.85, and that in the direction parallel to the tracks is 0.9.

Moreover, an attenuation rate in an effective diameter of the objective lens is approximately 79%, making it possible to perform reading in a sufficiently high-power range of the laser.

For example, when the amount of light emitted from the objective lens 10 during reproducing from a single-layered medium is 0.3 mW, the output of the semiconductor laser 1 is 7.1 mW. Thus, the influence of the laser noise becomes sufficiently small.

Figure 10:
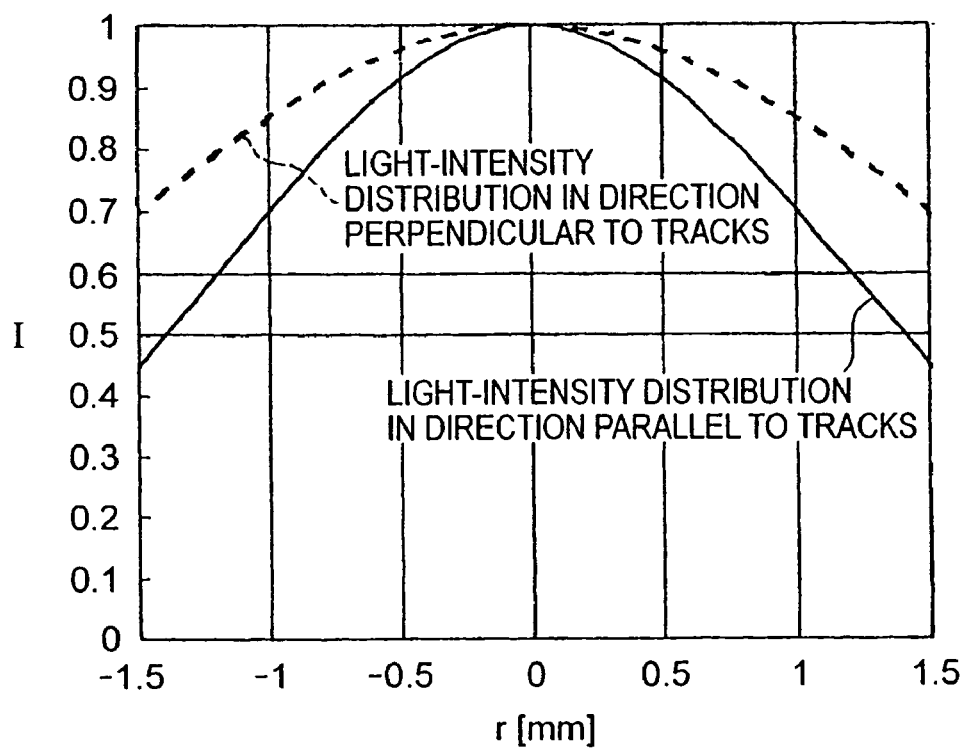
FIG. 10 is a graph illustrating an intensity distribution when the light-attenuating element 16 is switched to a recording mode in the second embodiment.

FIG. 10 is a graph illustrating an intensity distribution when the light-attenuating element 16 is switched to a recording mode and the second filter is used.

At this time, the rim intensity on the objective lens in the direction perpendicular to the tracks is 0.85, and that in the direction parallel to the tracks is 0.7.

Moreover, an attenuation rate in an effective diameter of the objective lens is approximately 42%, which is within a reasonable range for driving the semiconductor laser 1 also during power output for writing.

For example, when the amount of light emitted from the objective lens 10 during recording in a two-layered medium is 10 mW at peak, the output of the semiconductor laser 1 is 86 mW, which is within a range for a GaN-based semiconductor laser of a high-power type to be driven with a margin.

In this manner, required resolution both in the direction parallel to the tracks and in the direction perpendicular to the tracks can be achieved and laser noise can be reduced without requiring separate beam-shaping and light-attenuating elements.

Moreover, the beams can be appropriately shaped during recording and during reproducing individually.

According to the apparatus for optically reproducing and recording the information described above, the resolution during recording can also be arbitrarily set, and more stable reading-writing operations can be realized in addition to the effects of the first embodiment.

Moreover, in this embodiment, the transmittance distribution is utilized for the beam-shaping, but a reflectance distribution, a polarization distribution, or the like may be utilized.

Third Embodiment

Figure 11:
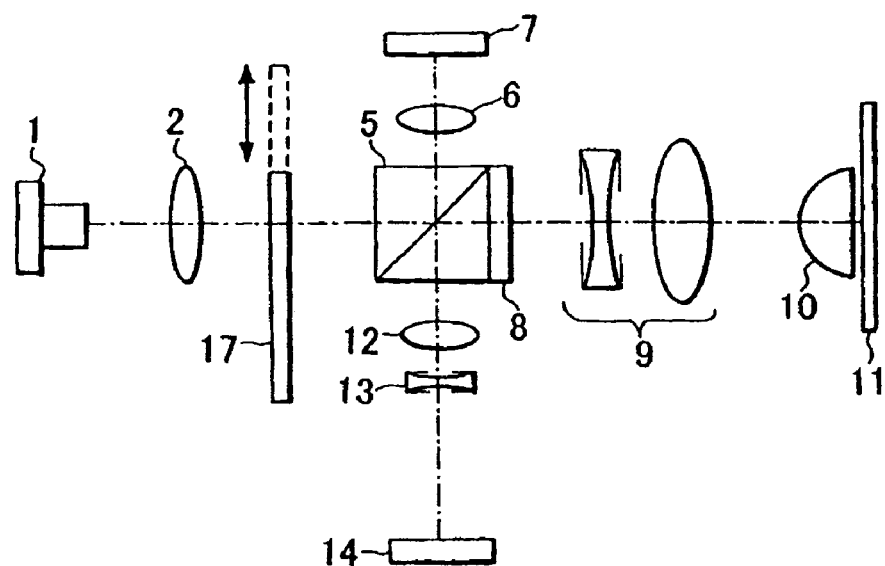
FIG. 11 illustrates an overview of an apparatus for optically reproducing and recording information according to a third embodiment of the present invention.

FIG. 11 illustrates an overview of an apparatus for optically reproducing and recording information according to a third embodiment of the present invention. Like reference numerals will be used to indicate elements similar to those in the first and second embodiments.

Divergent elliptical light beams emitted from a semiconductor laser 1 are collimated by a collimating lens 2, and enter a polarized-beam splitter 5.

Part of the incident beams is reflected, and is converged on a front-monitoring photodiode 7 by a monitoring lens 6.

The output of the semiconductor laser 1 is controlled on the basis of the output of this front-monitoring photodiode 7.

On the other hand, the light beams passing through the polarized-beam splitter 5 are converted into circularly polarized light beams by a quarter-wave plate 8, and the resultant beams enter a beam expander 9.

The beam expander 9 includes a combination of a concave lens and a convex lens. The concave lens is movable in the optical-axis direction so as to correct spherical aberration generated by an error in thickness of a protective layer on the recording medium.

The light beams passing through the beam expander 9 are converged on a recording medium 11 by an objective lens 10.

The light beams reflected from the recording medium 11 pass through the objective lens 10, the beam expander 9, and the quarter-wave plate 8, and are reflected by the polarized-beam splitter 5 so as to be guided to a photodetector 14 by a converging lens 12 and a sensor lens 13.

A light-attenuating element 17 switches filters on the optical path between a first filter used for single-layered media and read-only media, and a second filter used for two-layered media.

The semiconductor laser 1 has a divergent angle θ of 12° in the horizontal direction and a divergent angle θ of 24° in the vertical direction, and thus, has an aspect ratio of two. The objective lens 10 is of NA 0.85, and has an effective diameter of 2 mm.

The collimating lens 2 is of NA 0.13, and has a focal length of 10 mm.

If the light-attenuating element 17 were not inserted into the optical path, efficiency of the output from the semiconductor laser 1 to the objective lens 10 is 20%.

The light-attenuating element 17 has transmittance distributions that are uniform in the direction perpendicular to the tracks and that continuously change in the direction parallel to the tracks.

Figure 12:
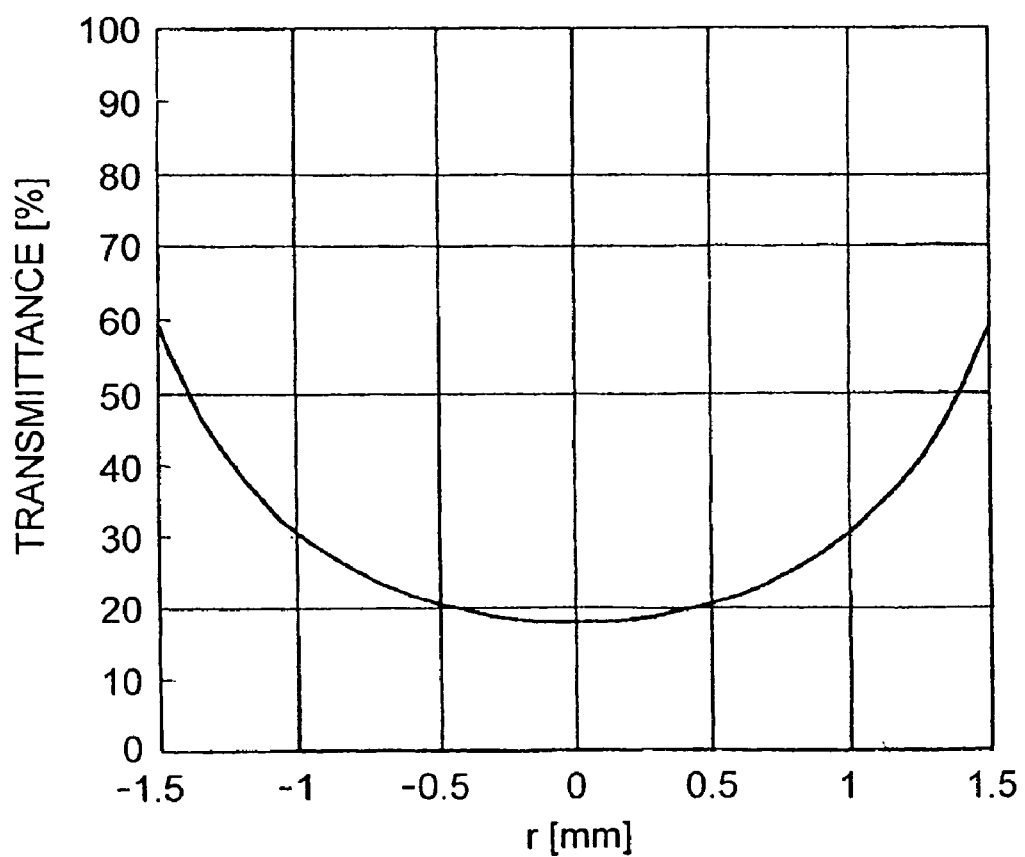
FIG. 12 is a graph illustrating a transmittance distribution of a light-attenuating element 17 in the direction parallel to the tracks when a single-layered medium is inserted in the third embodiment.
Figure 13:
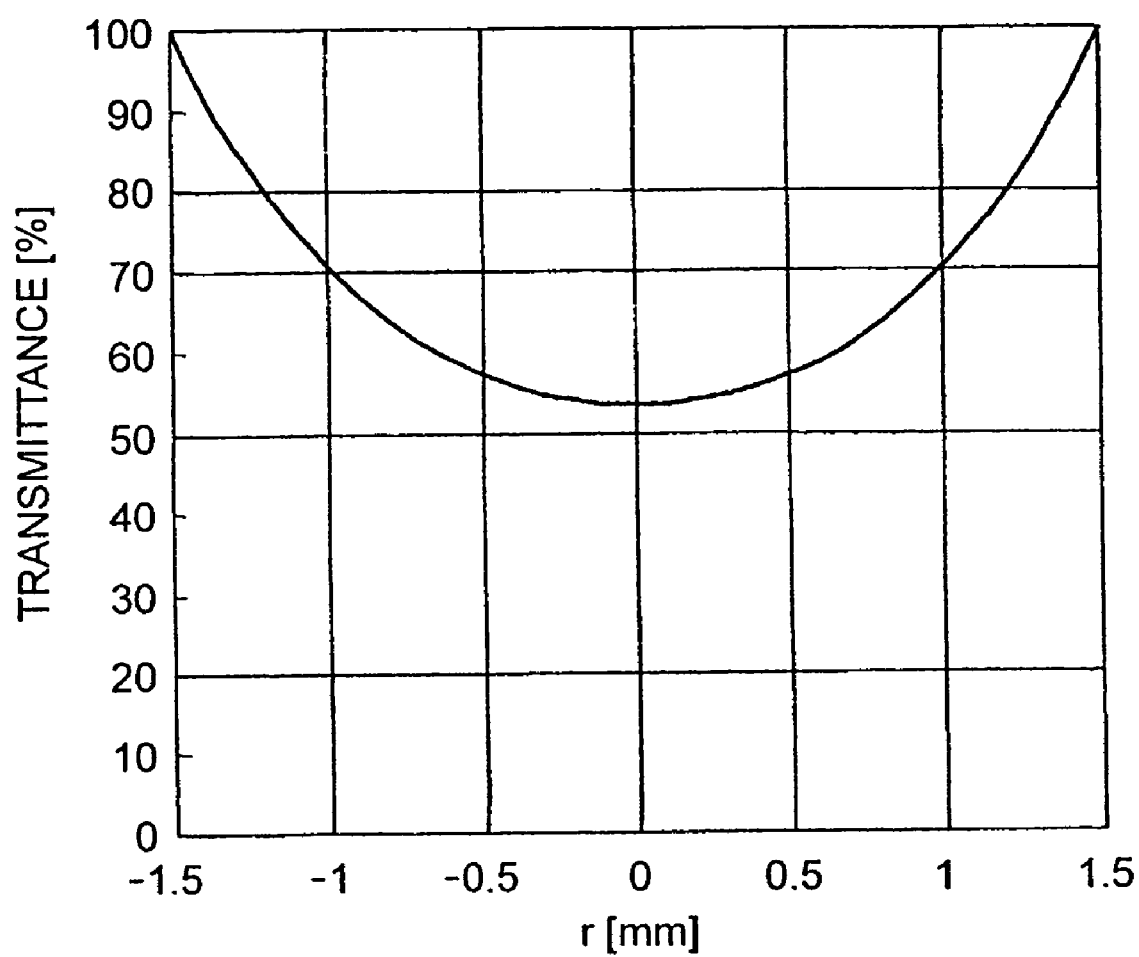
FIG. 13 is a graph illustrating a transmittance distribution of the light-attenuating element 17 in the direction parallel to the tracks when a two-layered medium is inserted in the third embodiment.

FIG. 12 is a graph illustrating a transmittance distribution of the light-attenuating element 17 in the direction parallel to the tracks when a single-layered medium is inserted and the first filter is used, and FIG. 13 is a graph illustrating a transmittance distribution of the light-attenuating element 17 in the direction parallel to the tracks when a two-layered medium is inserted and the second filter is used.

Figure 14:
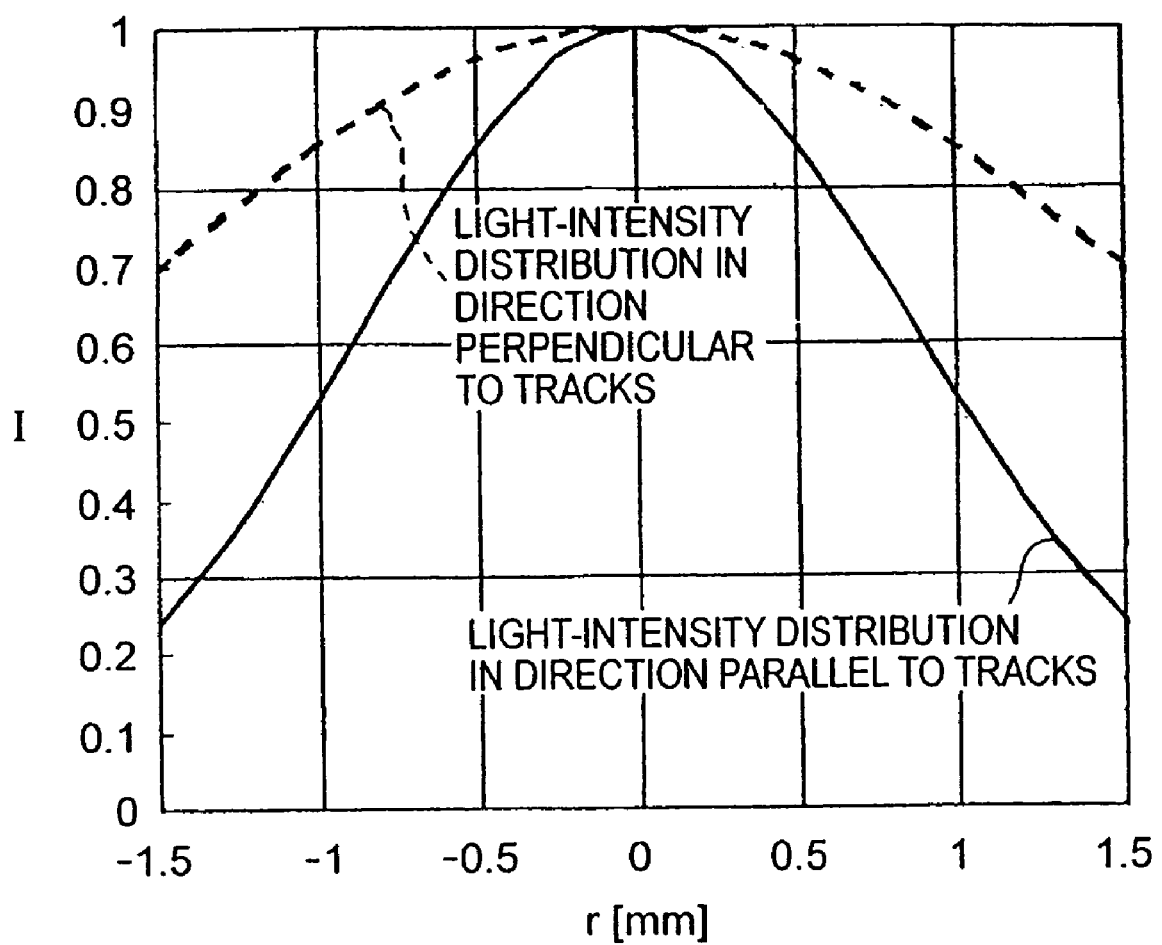
FIG. 14 is a graph illustrating a light-intensity distribution of the parallel light beams if the light-attenuating element 17 were not inserted into the optical path in the third embodiment.

FIG. 14 is a graph illustrating a light-intensity distribution of the parallel light beams if the light-attenuating element 17 were not inserted into the optical path. The light beams are elliptical, having the major axis in the direction perpendicular to the tracks.

At this time, the rim intensity on the objective lens in the direction perpendicular to the tracks is 0.85, and that in the direction parallel to the tracks is 0.53.

Figure 15:
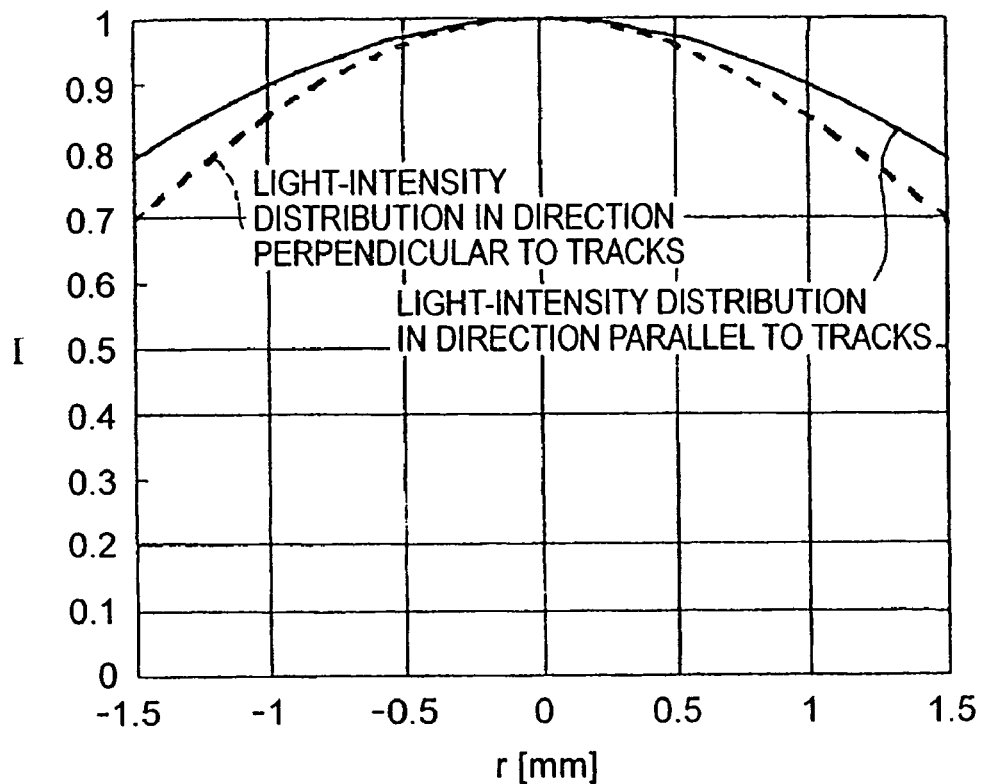
FIG. 15 is a graph illustrating an intensity distribution of the light-attenuating element 17 when a single-layered medium is inserted in the third embodiment.

FIG. 15 is a graph illustrating an intensity distribution when the light-attenuating element 17 is switched to a mode for single-layered media and the first filter is used.

At this time, the rim intensity on the objective lens in the direction perpendicular to the tracks is 0.85, and that in the direction parallel to the tracks is 0.9.

Moreover, an attenuation rate in an effective diameter of the objective lens is approximately 71%, making it possible to perform reading in a sufficiently high-power range of the laser.

For example, when the amount of light emitted from the objective lens 10 during reproducing from a single-layered medium is 0.3 mW, the output of the semiconductor laser 1 is 5.2 mW. Thus, the influence of the laser noise becomes sufficiently small.

Similarly, when the amount of light emitted from the objective lens 10 during reproducing from a two-layered read-only medium is 0.6 mW, the output of the semiconductor laser 1 is 10.4 mW. Thus, the influence of the laser noise becomes sufficiently small.

Moreover, when the amount of light emitted from the objective lens 10 during recording in a single-layered medium is 5.0 mW, the output of the semiconductor laser 1 is 86 mW, which is within a range for a GaN-based semiconductor laser of a high-power type to be driven with a margin.

Figure 16:
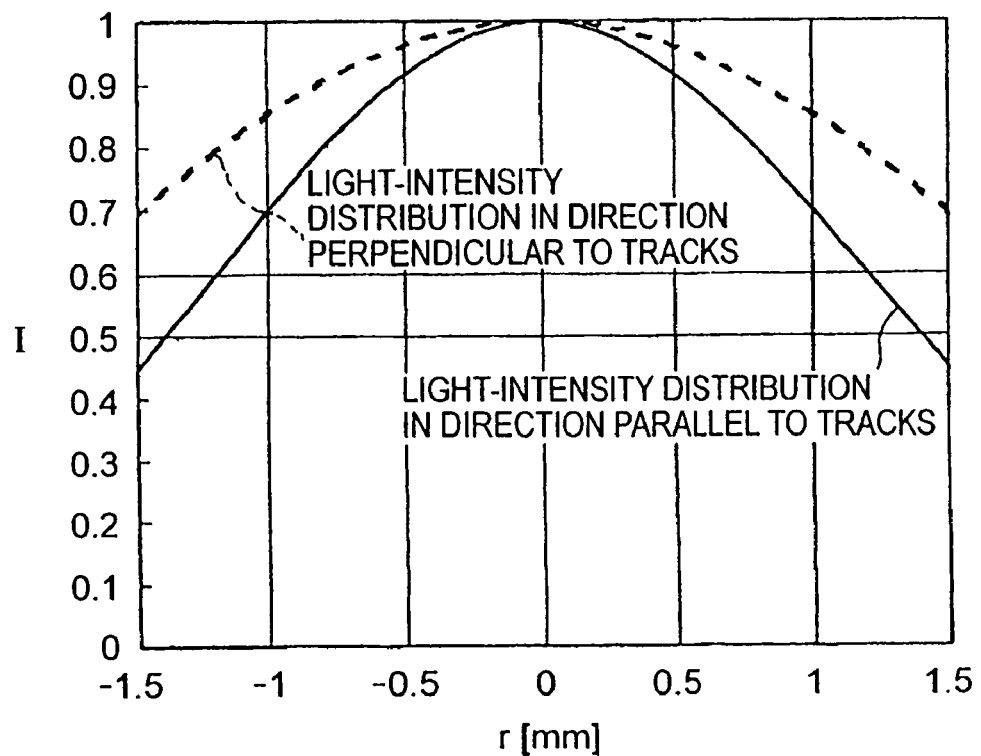
FIG. 16 is a graph illustrating an intensity distribution of the light-attenuating element 17 when a two-layered medium is inserted in the third embodiment.
Figure 17:
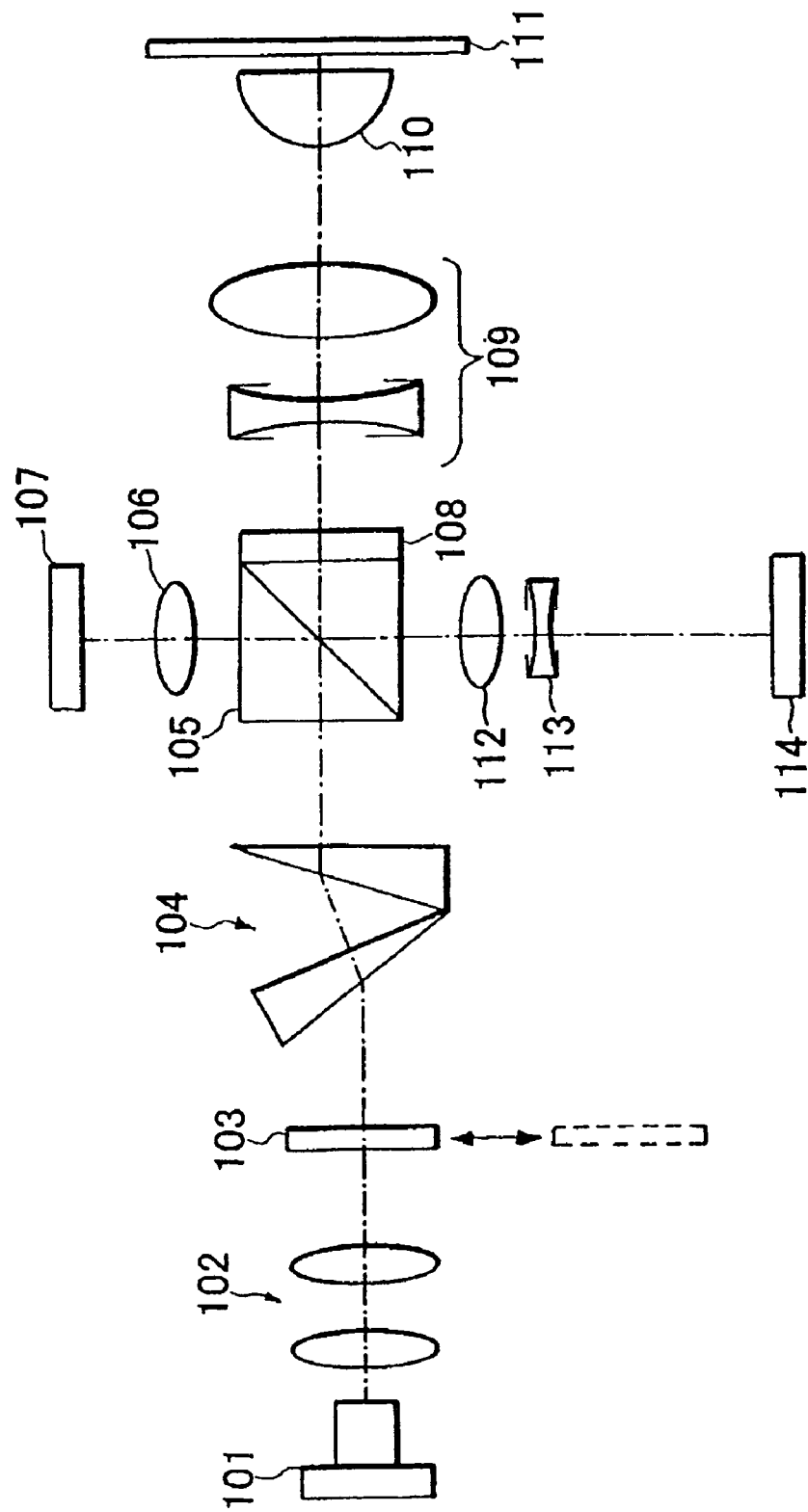
FIG. 17 illustrates a known apparatus for optically reproducing and recording information.

FIG. 16 is a graph illustrating an intensity distribution when the light-attenuating element 17 is switched to a mode for two-layered media and the second filter is used.

At this time, the rim intensity on the objective lens in the direction perpendicular to the tracks is 0.85, and that in the direction parallel to the tracks is 0.7.

Moreover, an attenuation rate in an effective diameter of the objective lens is approximately 42%, which is within a reasonable range for driving the semiconductor laser 1 also during power output for writing.

For example, when the amount of light emitted from the objective lens 10 during recording in a two-layered medium is 10 mW at peak, the output of the semiconductor laser 1 is 86 mW, which is within a range for a GaN-based semiconductor laser of a high-power type to be driven with a margin.

Moreover, when the amount of light emitted from the objective lens 10 during reproducing from a two-layered medium is 0.6 mW, the output of the semiconductor laser 1 is 5.2 mW. Thus, the influence of the laser noise becomes sufficiently small.

In this manner, required resolution both in the direction parallel to the tracks and in the direction perpendicular to the tracks can be achieved, and laser noise can be reduced without requiring separate beam-shaping and light-attenuating elements.

Moreover, the beams can be appropriately shaped according to types of inserted media.

According to the apparatus for optically reproducing and recording the information described above, the filters are switched according to the types of the media. Thus, there is no time loss during switching between reading and writing operations, in addition to the effects of the first embodiment.

Moreover, in this embodiment, the transmittance distribution is utilized for the beam-shaping, but a reflectance distribution, a polarization distribution, or the like, may be utilized.

Furthermore, in this embodiment, switching between two transmittance distributions is effected, but, for example, switching between three or more transmittance distributions may be effected to include a mode for three-layered media, a mode for four-layered media, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-157455 filed May 30, 2005, which is hereby incorporated by reference herein in its entirety.

What is claimed is:

1. An apparatus for effecting at least one of optically reproducing and recording information, the apparatus comprising:
   a semiconductor laser for emitting a light beam;
   an objective lens that focuses the light beam emitted from the laser onto a recording medium; and
   a light-attenuating element for attenuating an amount of light of the light beam, wherein (i) said light-attenuating element has a transmittance distribution for shaping a section of the light beam, the transmittance distribution comprising a plurality of transmittance distributions, and (ii) said light-attenuating element uses different transmittance distributions for reproducing and for recording.

2. The apparatus according to claim 1, wherein the transmittance distribution of said light-attenuating element shapes the section of the light beam into an approximate circle.

3. The apparatus according to claim 1, wherein the transmittance distribution of said light-attenuating element becomes higher with a distance from the optical axis of the light beam.

4. The apparatus according to claim 1, wherein the transmittance distribution is uniform in one direction and non-uniform in a transverse direction.

5. The apparatus according to claim 4, wherein the transmittance distribution continuously changes in the transverse direction.

6. The apparatus according to claim 4, wherein said light-attenuating element causes an intensity distribution of the light beams to be substantially identical in both the one direction and the transverse direction.

7. The apparatus according to claim 1, wherein said light-attenuating element comprises a glass plate with a metallic film deposited on a surface thereof.

8. An apparatus for recording information onto recording media having different layered structures, the apparatus comprising:
   a semiconductor laser for emitting a light beam;
   an objective lens that focuses the light beam emitted from the laser onto a recording medium; and
   a light-attenuating element for attenuating an amount of light of the light beam, wherein (i) said light-attenuating element has a transmittance distribution for shaping a section of the light beam, the transmittance distribution comprising a plurality of transmittance distributions, and (ii) said light-attenuating element uses different transmittance distributions depending on the layered structure of the recording medium.

9. The apparatus according to claim 8, wherein the transmittance distribution of said light-attenuating element shapes the section of the light beam into an approximate circle.

10. The apparatus according to claim 8, wherein the transmittance distribution of said light-attenuating element becomes higher with a distance from the optical axis of the light beam.

11. The apparatus according to claim 8, wherein the transmittance distribution is uniform in one direction and non-uniform in a transverse direction.

12. The apparatus according to claim 11, wherein the transmittance distribution continuously changes in the transverse direction.

13. The apparatus according to claim 11, wherein said light-attenuating element causes an intensity distribution of the light beam to be substantially identical in both the one direction and the transverse direction.

14. The apparatus according to claim 8, wherein said light-attenuating element comprises a glass plate with a metallic film deposited on a surface thereof.

15. An apparatus for effecting at least one of optically reproducing and recording information, the apparatus comprising:
   producing means for producing a laser light beam;
   focusing means for focusing the light beam from said producing means onto a recording medium; and
   light-attenuating means for attenuating an amount of light of the light beam, wherein (i) said light-attenuating means has a transmittance distribution for shaping a section of the light beam, the transmittance distribution comprising a plurality of transmittance distributions, and (ii) said light-attenuating means uses different transmittance distributions for reproducing and for recording.

16. The apparatus according to claim 15, wherein the transmittance distribution of the light-attenuating means shapes the section of the light beam into an approximate circle.

17. The apparatus according to claim 15, wherein the transmittance distribution of said light-attenuating means becomes higher with a distance from the optical axis of the light beam.

18. The apparatus according to claim 15, wherein the transmittance distribution is uniform in one direction and non-uniform in a transverse direction.

19. The apparatus according to claim 18, wherein the transmittance distribution continuously changes in the transverse direction.

20. The apparatus according to claim 18, wherein said light-attenuating means causes an intensity distribution of the light beams to be substantially identical in both the one direction and the transverse direction.

21. An apparatus for recording information onto recording media having different layered structures, the apparatus comprising:
   producing means for producing a laser light beam;
   focusing means for focusing the light beams from said producing means onto a recording medium; and
   light-attenuating means for attenuating an amount of light of the light beam, wherein (i) said light-attenuating means has a transmittance distribution for shaping a section of the light beam, the transmittance distribution comprising a plurality of transmittance distributions, and (ii) said light-attenuating means uses different transmittance distributions depending on the layered structure of the recording medium.

22. The apparatus according to claim 21, wherein the transmittance distribution of said light-attenuating means shapes the section of the light beam into an approximate circle.

23. The apparatus according to claim 21, wherein the transmittance distribution of said light-attenuating means becomes higher with a distance from the optical axis of the light beam.

24. The apparatus according to claim 21, wherein the transmittance distribution is uniform in one direction and non-uniform in a transverse direction.

25. The apparatus according to claim 24, wherein the transmittance distribution continuously changes in the transverse direction.

26. The apparatus according to claim 24, wherein said light-attenuating means causes an intensity distribution of the light beams to be substantially identical in both the one direction and the transverse direction.

* * * * *